Feb. 18, 1958        W. L. SHIMMON        2,823,813

SELF-LOADING FORK-LIFT TRUCK

Filed April 6, 1956        3 Sheets-Sheet 1

INVENTOR.
William L. Shimmon
BY Webster & Webster
ATTYS.

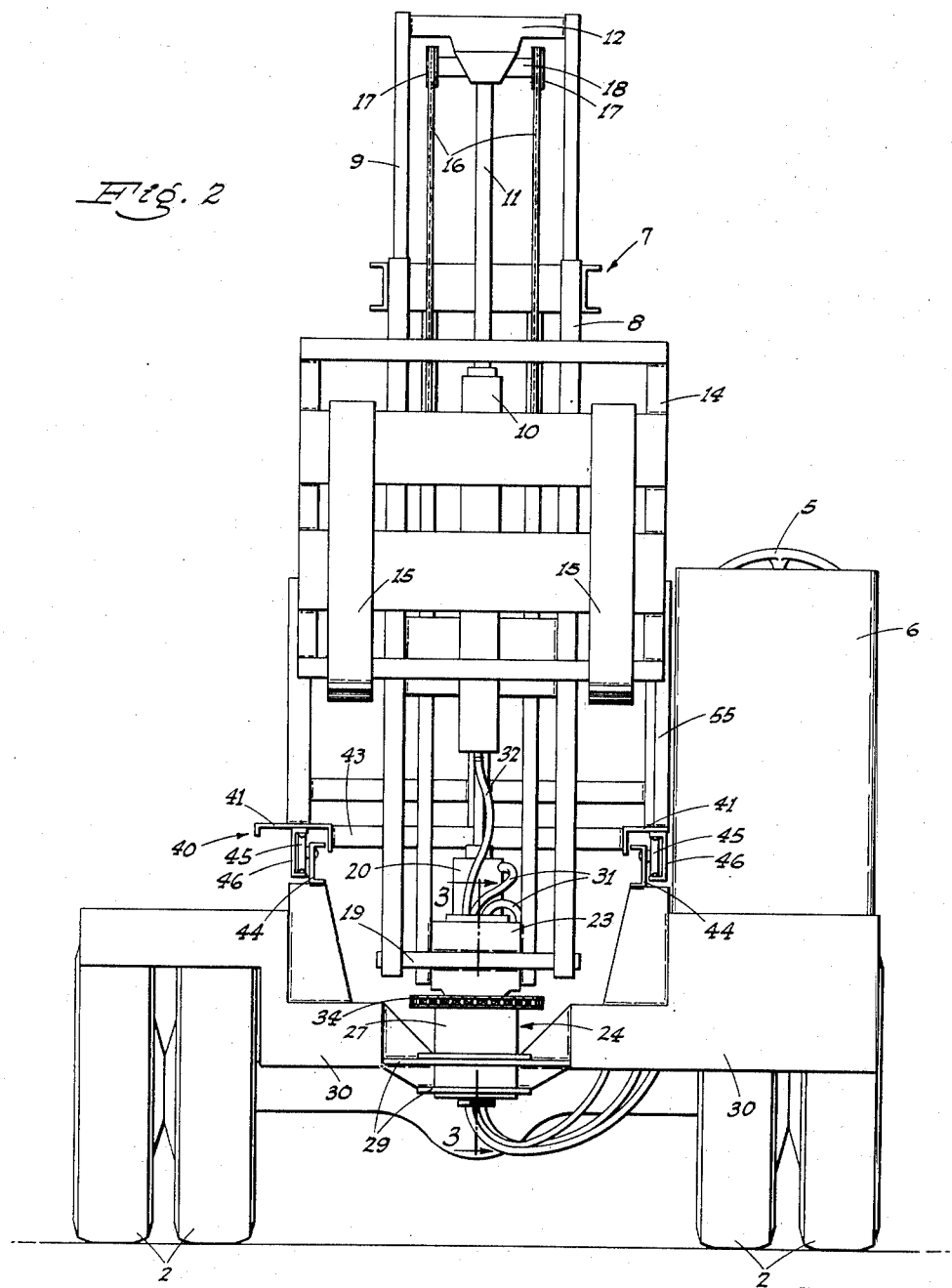

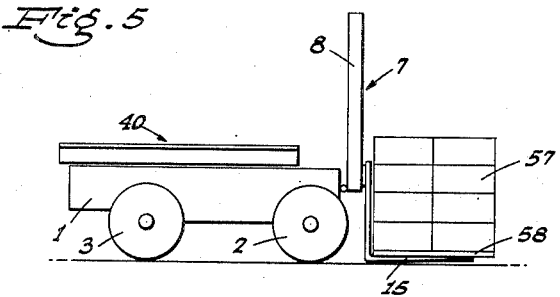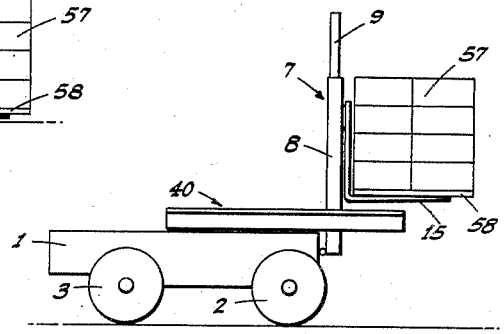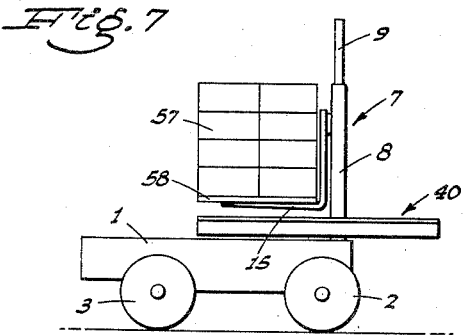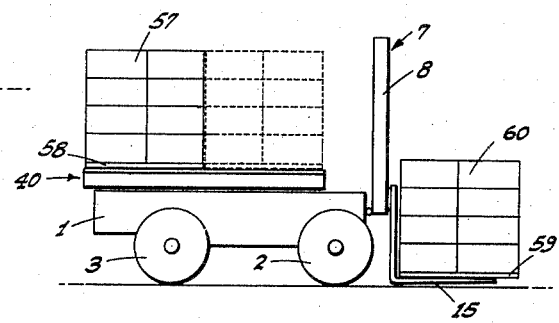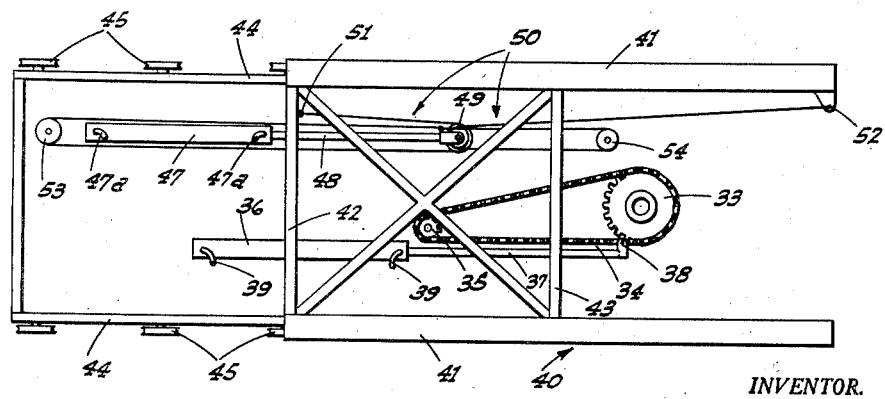

United States Patent Office 2,823,813
Patented Feb. 18, 1958

2,823,813

SELF-LOADING FORK-LIFT TRUCK

William L. Shimmon, Modesto, Calif.

Application April 6, 1956, Serial No. 576,731

13 Claims. (Cl. 214—75)

This invention relates in general to an improved fork-lift truck.

In particular the invention is directed to, and it is a major object to provide, a self-loading fork-lift truck; such truck being characterized by the inclusion of an upstanding fork-lift unit at the front of the truck and a load receiving bed rearwardly of such unit, the former being rotatable about an upstanding axis between a forwardly facing position to pick up a load and a rearwardly facing position to deposit the load on the bed of the truck for transport by the latter.

Another important object of the present invention is to provide a self-loading fork-lift truck, as above, in which the load receiving bed is mounted on the truck for power actuated longitudinal shifting or sliding motion, whereby after a first load is deposited on the bed by the rotary fork-lift unit, such bed can be shifted a distance sufficient to permit of its reception of a second load from said unit, and without obstruction by said first load.

A further object of the invention is to provide a self-loading fork-lift truck which includes a novel power actuated mechanism for rotating the fork-lift unit between its forwardly facing and rearwardly facing positions.

A still further object of the invention is to provide a self-loading fork-lift truck which includes a novel power actuated mechanism for accomplishing the aforementioned longitudinal shifting or sliding of the load receiving bed.

One of the features of the present invention is the fact that the mast for the fork lift unit may rotate through a wide amplitude of movement and tilt at any position in such movement.

Still another object of the invention is the fact that after successive loads have been deposited on the truck bed, they can be squeezed tightly together, thereby eliminating the necessity of roping the load. In prior loading operations it has been necessary to rope the load to the truck bed in order to prevent its dislodgement, the operation requiring the driver to dismount and occupying a considerable amount of time and effort, all of which are eliminated by the use of the present invention.

A still further feature of the invention is the fact that it is still possible to turn the load around over the drive wheels of the truck, even when no load is deposited on the truck bed. Traction of the vehicle is improved by distributing the load over the drive wheels where it is most effective and hence the present invention has considerable advantage over other construction.

An additional object of the invention is to provide a practical, reliable, and durable self-loading fork-lift truck, and one which will be exceedingly effective for the purpose for which it is described.

These objects are accomplished by means of such structure and relative arrangement of parts as will fully appear by a perusal of the following specification and claims.

In the drawings:

Fig. 1 is a side elevation of the self-loading fork-lift truck; the bed being shown in its central position in full lines, and in a retracted position in dotted lines.

Fig. 2 is an enlarged front end view of the truck.

Fig. 3 is an enlarged fragmentary sectional elevation on line 3—3 of Fig. 2, showing particularly the rotary mount for the fork-lift unit.

Fig. 4 is a diagrammatic plan view of the bed, its mount, the actuating mechanism for said bed, and the actuating mechanism for the rotary mount of the fork lift unit.

Figs. 5–8 inclusive are diagrammatic side elevations showing the various positions of the rotary fork-lift unit and sliding bed which the same occupy in the sequential steps of picking up a load and depositing the same on such bed.

Referring now more particularly to the drawings, and to the characters of reference marked thereon, the novel self-loading fork-lift truck comprises a generally flat-topped body 1, supported by front wheels 2 and rear wheels 3; the wheels being driven from an engine (not shown) contained in the body 1.

An operator's seat 4 is disposed adjacent the front of the body 1 in laterally offset relation, as is the steering wheel 5 and a protective shield 6 which upstands directly ahead of said steering wheel.

A fork-lift unit, indicated generally at 7, is disposed immediately ahead of the front end of the body 1, and such unit includes—except for the rotary mount, which will hereinafter be described—a substantially conventional structure. More specifically, the fork-lift unit 7 is comprised of an upstanding frame 8 which is vertically fixed and in which an elevator frame 9 is vertically slidable.

An upstanding, elongated, fluid pressure power cylinder 10 is disposed centrally in the assembly of frames 8 and 9; such cylinder being connected—at its lower end—to the frame 8, while the piston rod 11 of the cylinder projects upwardly and connects to a cross bar 12 which forms the top of the elevator frame 9.

The elevator frame 9 provides the support for a vertically movable elevator carriage, indicated in part at 13, and to which carriage an exterior mounting frame 14 is attached; such mounting frame 14 having transversely spaced, forwardly projecting, load pick-up forks 15 secured thereto.

An assembly of transversely spaced lift chains 16 are connected at their ends to the top of the frame 8 and the elevator carriage 13, respectively; such chains turning—intermediate their ends—over sprockets 17 carried on a cross shaft 18 in the upper portion of the elevator frame 9. With this arrangement, expansion of the power cylinder 10 slides the elevator frame 9 in an upward direction, and in turn the lift chains 16 raise the mounting frame 14 and forks 15; contraction of the power cylinder 10 having the reverse effect.

At its lower end the upstanding frame 8 is secured to a transverse pivot shaft 19 for forward and rearward tilting motion as operation of the unit may require; such tilting being accomplished by a fluid pressure power cylinder 20 secured to, and extending at a forward incline from, a transverse pivot shaft 21 carried between the rear ends of laterally spaced arms 22 which extend rearwardly from a front cross plate 23 to which the pivot shaft 19 is secured.

The power cylinder 20 includes an upwardly projecting piston rod 20a connected at its upper end to a rearwardly projecting arm 20b fixed in connection with the upstanding frame 8.

The above described fork-lift unit, while of generally conventional form, as aforesaid, is constructed so that the assembly of the upstanding frame 8 and elevator frame 9 is relatively narrow transversely of the truck when said fork-lift unit is facing forwardly. The purpose of this feature will hereinafter appear.

The fork-lift unit 7 is supported from its lower end, and for rotation about an upstanding axis, by a rotary mount, indicated generally at 24, and which comprises the following:

A rotary head 25 is disposed between the arms 22 immediately to the rear of the front cross plate 23, and is secured to said arms and plate as by welding. At its lower end the rotary head 25 merges with an integral depending spindle or neck 26 journaled in a cylindrical cage 27 by means including vertically spaced bearings 28 of combination anti-friction and thrust type as shown in Fig. 3. The cylindrical cage 27 is fixedly mounted, as at 29, centrally in connection with the front cross structure 30 of the truck.

The rotary head 25 and spindle 26 are tubular, as shown, to permit of the passage of a pair of flexible conduits 31 which lead to the power cylinder 20, and a third conduit 32 which leads to the power cylinder 10; all of such conduits being included in a valve regulated system which the operator controls in a conventional manner from his station on the seat 4.

The rotary head 25 and the fork-lift unit 7 secured to and upstanding therefrom are adapted to be rotated substantially 180 degrees; i. e., sufficient to rotate the fork-lift unit 7 between a forwardly facing position and a rearwardly facing position, by the following mechanism:

A sprocket 33 is fixed on the rotary head 25 below the arms 22, and such sprocket has an endless chain 34 trained thereabout from the rear. Such endless chain, as is shown in Fig. 4, extends rearwardly from the sprocket 33, and at the rear end thereof said chain 34 turns about a small idler sprocket 35 suitably journaled to the top of the body 1.

A double acting, fluid pressure power cylinder 36 is suitably anchored to, and disposed lengthwise along, the top of the body 1 to the rear of the chain 34, with the piston rod 37 of said cylinder 36 extending along and parallel to one run of such chain. At its free end the piston rod 37 is connected, as at 38, to said run of the chain. By actuation of the power cylinder 36 to retract or advance the piston rod 37 such motion is translated to the endless chain 34 and in turn causes the sprocket 33 to rotate the fork-lift unit 7 from its forwardly facing position to its rearwardly facing position, and vice versa, respectively. The power cylinder 36 is controlled by the operator, from his station on seat 4, by a valve regulated, fluid pressure conduit system, here shown only in part at 39.

In a position normally rearwardly of the rotary fork-lift unit 7 the truck supports a longitudinally shiftable, load supporting bed, indicated generally at 40, such bed including transversely spaced side beams 41 connected together by a rear cross member 42 and an intermediate cross member 43; said beams 41 having no transverse connection ahead of said member 43, for the reason as will hereinafter appear.

The longitudinally shiftable bed 40 is supported for to and fro sliding motion relative to the body 1 as follows:

Fixed longitudinal beams 44 are secured on the body 1 and lie directly inwardly of the corresponding side beams 41; such beams 40 each being fitted with a row of longitudinally spaced rollers 45 which engage in supporting relation in channel guides 46 fixed on the under side of the beams 41.

The load supporting bed 40 is adapted to be shifted forwardly or rearwardly from a substantially central position relative to the body 1 by means of the following power actuated mechanism:

A double acting, fluid pressure power cylinder 47 is suitably anchored to, and extends lengthwise of, the top of the body 1 adjacent the rear thereof; such cylinder 47 including a forwardly projecting piston rod 48 fitted at its free end with a multiple sheave 49. Such multiple sheave 49 is included in a double acting multiple cable system, indicated generally at 50, which extends lengthwise of the truck in connection between the body 1 and said bed 40. The cable system 50 includes—with multiple cables, as shown—anchor points 51 and 52 at opposite ends of the bed 40, and sheaves 53 and 54 suitably attached to the body 1 adjacent opposite ends of the latter.

With operation of the power cylinder 47 to cause motion of the piston rod 48 in one direction or the other, the cable system 50 translates such motion into related sliding of the bed 40 relative to the body 1. The power cylinder 47 is controlled by the operator, from his station on seat 4, by a valve regulated, fluid pressure conduit system, here shown only in part at 47a.

A longitudinal, protective fence 55 upstands from the side of the bed 40 adjacent the operator's seat 4; such fence being omitted—for the sake of clarity—from all views except Fig. 1. Additionally, a protective stop post assembly 56 is secured to, and upstands from, the arms 22 rearwardly of the assembly of the fork-lift unit frames 8 and 9 as shown in Fig. 3; such stop post assembly 56 thus being mounted to rotate with said fork-lift unit 7.

The above described self-loading fork-lift truck functions in the following manner to pick up a load 57 on a pallet 58, and to then deposit such pallet-supported load on the bed 40; the successive steps in each loading cycle being shown particularly and diagrammatically in Figs. 5-8 inclusive:

With the bed 40 initially in a substantially centralized position relative to the body 1, and with the rotary fork-lift unit facing forwardly with the forks 15 lowered, the truck is advanced until such forks project beneath the pallet 58 supporting the load 57 (see Fig. 5).

The unit 7 is then actuated by the power cylinder 10 to cause the forks, together with the engaged pallet supported load, to raise to a level above the horizontal plane of the bed 40 (see Fig. 6).

Nextly, the bed 40 is shifted forwardly, by suitable actuation of the power cylinder 47, until the rear portion of said bed overlies the forward portion of the body 1, and at which time the free and forwardly projecting front portions of the side beams 41 extend in spaced relation on opposite sides of the fork-lift unit 7, projecting some distance ahead thereof, as shown in both Figs. 6 and 7; the unit 7 being narrow for clearance.

Thereafter, the fork-lift unit 7 is rotated clockwise substantially 180 degrees by suitable operation of the power cylinder 36, which disposes the forks 15 and the pallet 58 with the load 57 thereon directly above the then advanced but rear portion of the bed 40 (see Fig. 7). Then, by slightly lowering such forks the pallet 58 is brought to rest on the bed 40, whereupon the latter is retracted to substantially its starting position (see Fig. 8).

Nextly, the forks 15 are raised slightly and the power cylinder 36 is actuated in a direction to return the rotary fork-lift unit 7 to its forwardly facing position, and whereupon said forks are lowered to adjacent the ground so that said forks may be run under another pallet 59 likewise supporting a load 60.

By repeating the above described operation of the fork-lift unit 7, the second pallet 59 and its load 60 can be lifted, swung around 180 degrees, and deposited on the forward portion of the bed 40, as shown in dotted lines in Fig. 8.

After this is accomplished the bed 40 is run rearwardly (see Fig. 1) sufficient to permit the forks 15, as well as the entire fork-lift unit 7, to again be swung back to their forwardly facing position; the bed then being returned to its substantial central position.

When the fork-lift unit is in its forwardly facing position, the stop post assembly 56 upstands directly ahead of the load and prevents any possible shifting thereof forwardly into engagement with said unit.

With the described fork-lift truck, pallet supported loads can be readily and conveniently picked up and deposited on the bed 40 for subsequent transport by the truck; all under the easy and ready control of the operator from his station at the seat 4.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A self-loading fork-lift truck comprising a wheel-supported, self-propelled body, a fork-lift unit upstanding adjacent one end of the body, said unit including outwardly projecting, vertically movable forks adapted to engage beneath and lift a load, a load receiving bed on the body, a rotary mount securing the fork-lift unit to said one end of the body for rotation between a position with the forks lowered and projecting forwardly and a position with the forks raised to a level above the bed and projecting rearwardly thereabove, means to rotate said fork-lift unit between said positions; means mounting the bed on the body for forward shifting movement from a position rearwardly of the unit to dispose the rearward portion of the bed over the forward portion of the body; the forward portion of the bed being open at the front and between the sides, the fork-lift unit upstanding in clearance relation between said sides when the bed is so shifted forwardly.

2. A self-loading fork-lift truck comprising a wheel-supported, self-propelled body, a fork-lift unit upstanding adjacent one end of the body, said unit including outwardly projecting vertically movable forks adapted to engage beneath and lift a load, a load receiving bed on the body, a rotary mount securing the fork-lift unit to said one end of the body for rotation between a position with the forks lowered and projecting forwardly and a position with the forks raised to a level above the bed and projecting rearwardly thereabove, and means to rotate said fork-lift unit between said positions; said mount embodying a rotary head to which the unit is attached, and said means including an endless chain trained about the sprocket and including an elongated run, a double acting power cylinder mounted on the truck and having a piston rod adjacent and substantially parallel to said run, and a connection between the piston rod and said run fixed to the head, and a power actuated chain trained about the sprocket.

3. A self-loading fork-lift truck comprising a wheel-supported, self-propelled body, a fork-lift unit upstanding adjacent one end of the body, said unit including outwardly projecting, vertically movable forks adapted to engage beneath and shift a load, a load receiving bed on the body, means mounting the bed for longitudinal shifting motion, power actuated means to shift the bed, a rotary mount securing the fork-lift unit to said one end of the body for rotation between a position with the forks lowered and projecting forwardly and a position with the forks raised to a level above the bed and projecting rearwardly thereabove, and power actuated means to rotate said fork-lift unit between said positions.

4. A self-loading fork-lift truck, as in claim 3, in which said bed shifting means includes a cable system connected between the body and bed, and a power cylinder associated in actuating relation with said cable system.

5. A self-loading fork-lift truck, as in claim 3, in which the means to shift the bed and the means to rotate the fork-lift unit each include a power cylinder.

6. A self-loading fork-lift truck comprising a wheel-supported, self-propelled body, a laterally offset operator's seat on the body adjacent one end thereof, a fork-lift unit upstanding adjacent said one end of the body, said unit including outwardly projecting, vertically movable forks adapted to engage beneath and lift a load, a load receiving bed on the body, means mounting the bed for longitudinal shifting motion, power actuated means to shift the bed, the path of motion of the bed being laterally inwardly of said operator's seat, a rotary mount securing the fork-lift unit to said one end of the body for rotation between a position with the forks lowered and projecting forwardly and a position with the forks raised to a level above the bed and projecting rearwardly thereabove, and power actuated means to rotate said fork-lift unit between said positions, and with the direction of such rotation being limited to the side of the body opposite said seat.

7. A self-loading fork-lift truck, as in claim 6, including a protective fence upstanding from and extending along the side of the bed adjacent the operator's seat.

8. In a fork-lift truck which includes a wheel-supported body, and a fork-lift truck adjacent one end of the body, a rotary mount on and securing the fork-lift unit to the body for rotation of said unit about an upstanding axis, a sprocket secured on the mount, an idler secured on the truck in the horizontal plane of and spaced from the sprocket, and endless chain about the sprocket and idler, the chain defining longitudinal runs between said sprocket and idler, and power means applied directly to one such run to move the same back and forth; said power means comprising a double-acting power cylinder unit mounted parallel to said one run and connected at one end to the truck and at the other end to the run; said unit and the chain run having a stroke and length, respectively, not less than half the circumferential extent of the sprocket.

9. A lift truck comprising a truck bed, a lift unit adjacent one end of said bed to vertically move a load and rotate a load from a first position outside the confines of said bed and at a different elevation from said bed to a second position on said bed, and means for moving a load on said bed relative to said lift unit from said second position to a third position remote from said second position.

10. A lift truck comprising a body having a load-receiving bed, a lift unit adjacent one end of said body adapted to engage and vertically move a load to the level of said bed, first means for rotatably mounting said lift unit on said body to rotate said lift unit from a loading position to a discharging position overlying said bed, and second means for moving said load relative to said lift unit to move said load on said bed to a position removed from said discharging position.

11. A self-loading fork-lift truck comprising a body, a fork-lift unit upstanding adjacent one end of said body, a rotary head rotatably mounting said unit on said body, said head comprising a vertical shaft connected to said unit and bearing means for said shaft connected to said body, power means operable to turn said shaft relative to said bearing means, an upstanding frame, a pivot shaft having a horizontal axis, first means connecting said pivot shaft to said vertical shaft, second means connecting said pivot shaft to said upstanding frame, one of said first and second means being tiltable relative to said pivot shaft, power means operable to tilt said upstanding frame about said pivot shaft as an axis, an elevator frame slidable along said upstanding frame, power means for sliding said elevator frame relative to said upstanding means, and outwardly projecting forks on said elevator frame, said forks being rotatable about said vertical shaft as an axis and being tiltable about said pivot shaft as an axis at substantially any position of rotation about said vertical shaft.

12. A fork-lift truck comprising a body, a lift unit adjacent one end of said body, and means mounting said lift unit on said body for rotative movement of said lift unit about a substantially vertical axis, said lift unit comprising a first frame, a second frame slidable longitudinally relative to said first frame, lift forks connected to said second frame, and means mounting said first frame for pivotal movement relative to said body about a substantially horizontal axis, said first and second frames being rotatable about said vertical axis and being tiltable about said horizontal axis at substantially any position of horizontal movement.

13. A lift truck comprising a truck bed, a lift unit adjacent one end of said bed to vertically move a load and rotate a load from a first position outside the confines of said bed and at a different elevation from said bed to a second position on said bed, means for moving a load on said bed relative to said lift unit from said second position to a third position remote from said second position, and means on the end of said bed opposite said lift unit extending substantially above the level of said bed, whereby successive loads deposited on said bed can be squeezed together by pushing an endmost load against said last-mentioned means.

References Cited in the file of this patent

UNITED STATES PATENTS

| | | |
|---|---|---|
| 897,451 | Bowman | Sept. 1, 1908 |
| 1,978,170 | Roesner | Oct. 23, 1934 |
| 2,267,509 | Strong | Dec. 23, 1941 |
| 2,327,135 | Scott | Aug. 17, 1943 |
| 2,538,505 | Carter | Jan. 16, 1951 |
| 2,540,569 | Crise | Feb. 6, 1951 |
| 2,544,456 | Gross | Mar. 6, 1951 |
| 2,621,811 | Lull | Dec. 16, 1952 |

FOREIGN PATENTS

| | | |
|---|---|---|
| 615,281 | Great Britain | Jan. 4, 1949 |